Dec. 4, 1923.  1,476,170
F. H. MORLAN
BRAKE APPARATUS FOR MOTOR VEHICLES
Filed Aug. 2, 1921   3 Sheets-Sheet 1
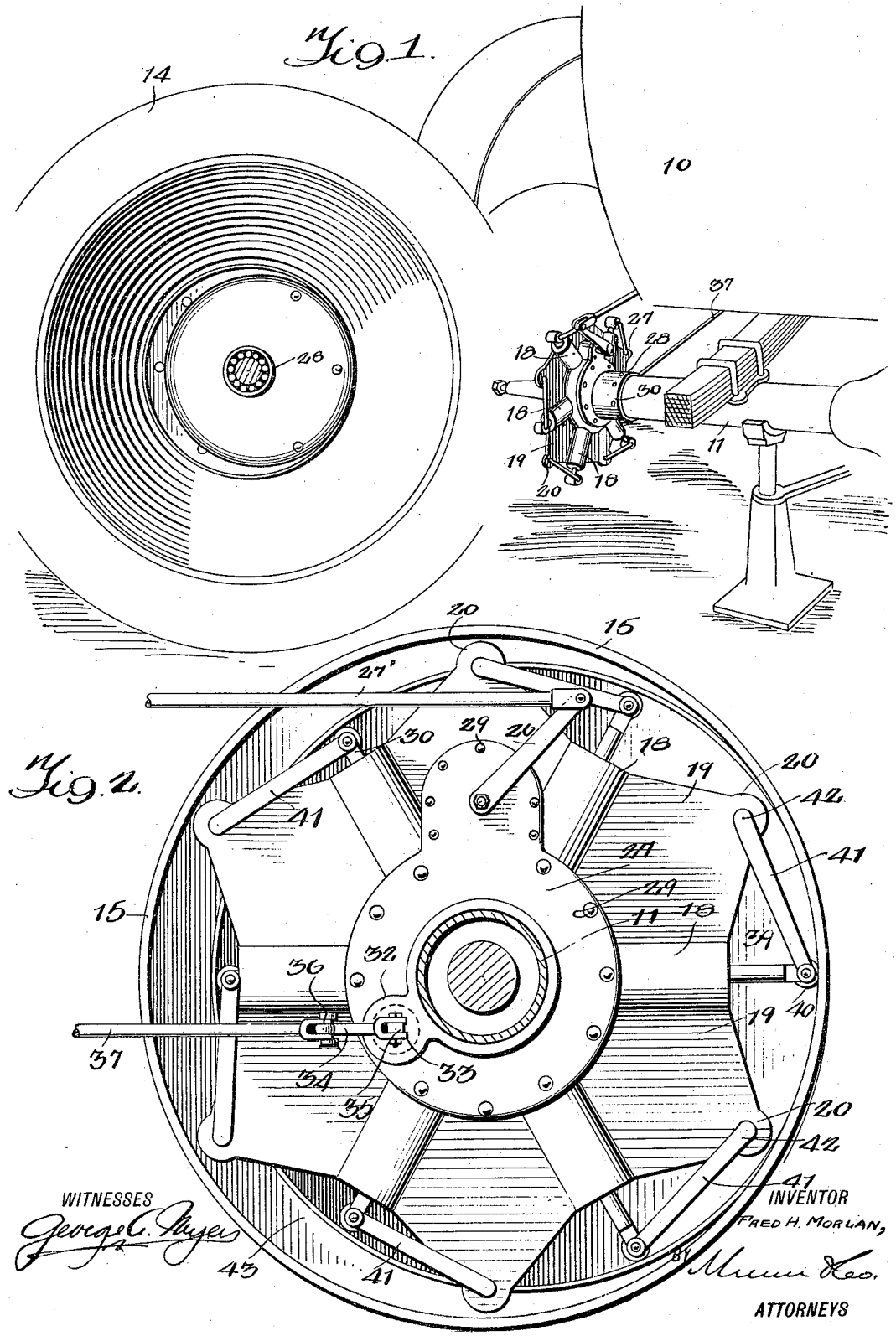
WITNESSES
INVENTOR
FRED H. MORLAN,
ATTORNEYS Dec. 4, 1923.
F. H. MORLAN
1,476,170
BRAKE APPARATUS FOR MOTOR VEHICLES
Filed Aug. 2, 1921   3 Sheets-Sheet 2
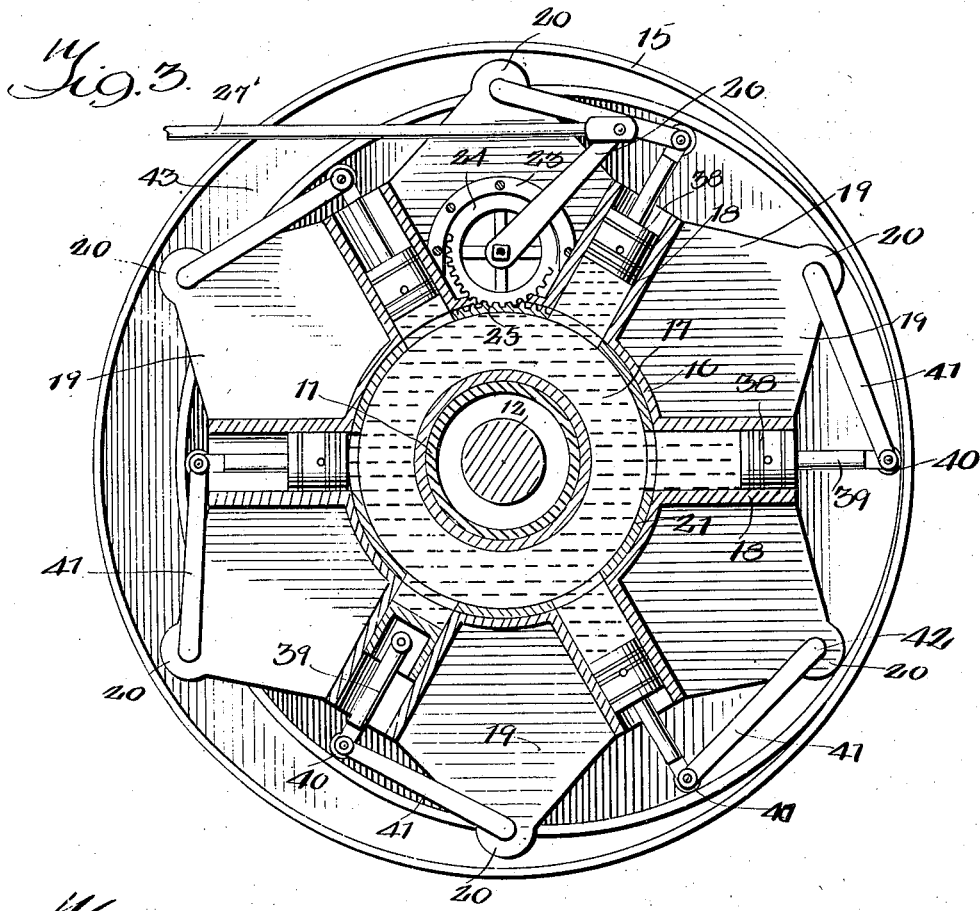
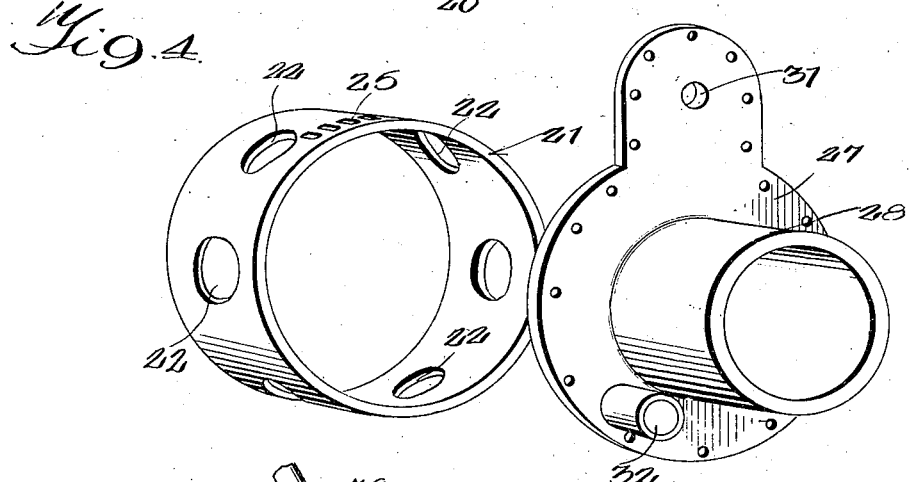
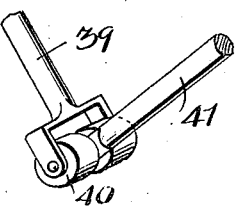
INVENTOR
FRED H. MORLAN,
BY
ATTORNEYS Dec. 4, 1923.  
F. H. MORLAN  
1,476,170  
BRAKE APPARATUS FOR MOTOR VEHICLES  
Filed Aug. 2, 1921  
3 Sheets-Sheet 3

WITNESSES  
INVENTOR  
Fred H. Morlan,  
BY  
ATTORNEYS

Patented Dec. 4, 1923.

1,476,170

UNITED STATES PATENT OFFICE.

FRED H. MORLAN, OF FAIRFIELD, ILLINOIS.

BRAKE APPARATUS FOR MOTOR VEHICLES.

Application filed August 2, 1921. Serial No. 489,226.

*To all whom it may concern:*

Be it known that I, FRED H. MORLAN, a citizen of the United States, and a resident of Fairfield, in the county of Wayne and State of Illinois, have invented certain new and useful Improvements in Brake Apparatus for Motor Vehicles, of which the following is a specification.

This invention relates to a brake apparatus for motor vehicles or the like.

The object of the invention is to utilize the non-compressible quality of a liquid in conjunction with an apparatus of the above character in such a manner that the wheels of the vehicle or the like with which the apparatus may be associated may be retarded against rotation in variable degrees or locked against rotation if so desired.

Other objects of the invention are, first, that the apparatus be extremely simple in construction, and second, that the parts constituting the same be not subjected to great wear or stress during the operation thereof.

It is also within the scope of the invention that the apparatus be inexpensive to manufacture and adapted to be applied to any standard type of manufacture of motor vehicles.

Other objects, and objects relating to details of construction, combination, and arrangement of parts, will hereinafter appear in the detail description to follow.

Figure 5:
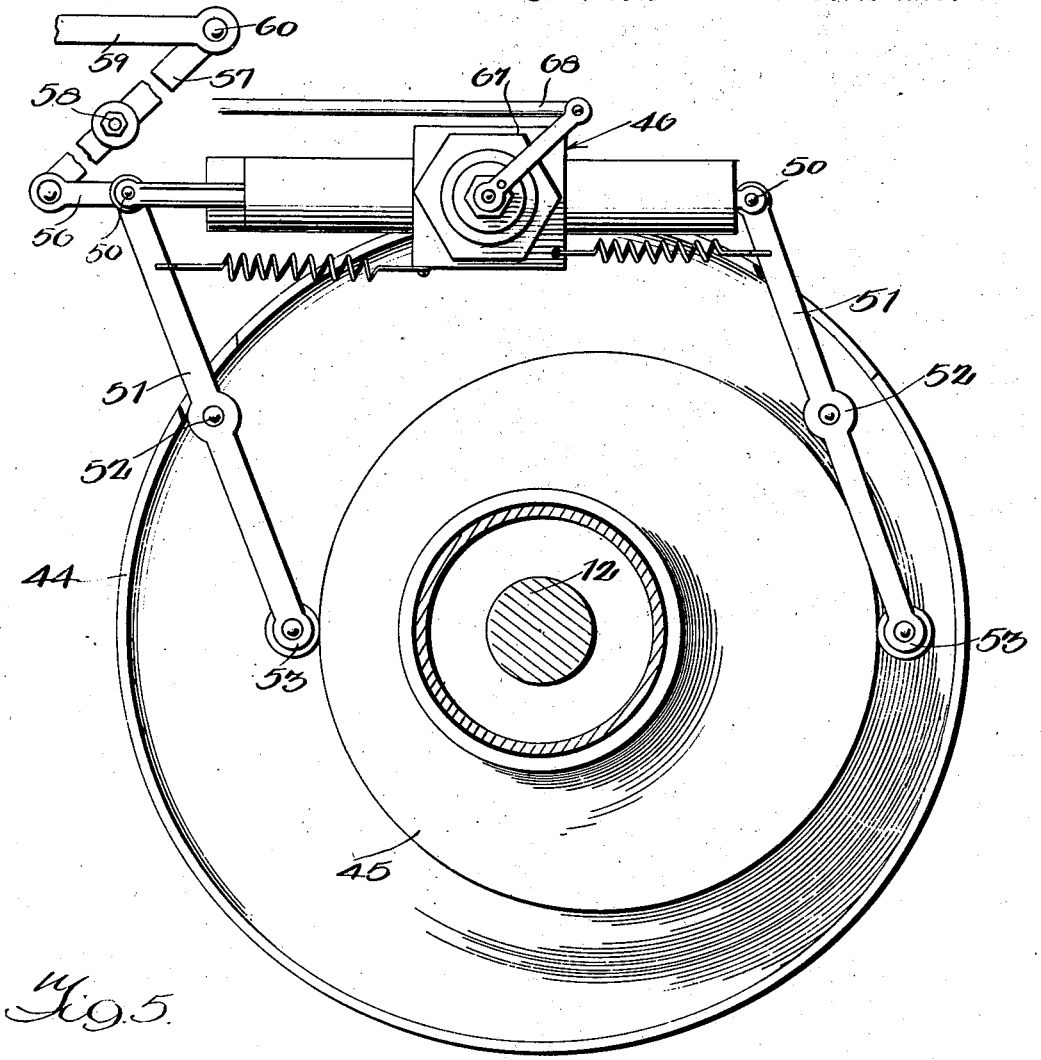
Figure 6:
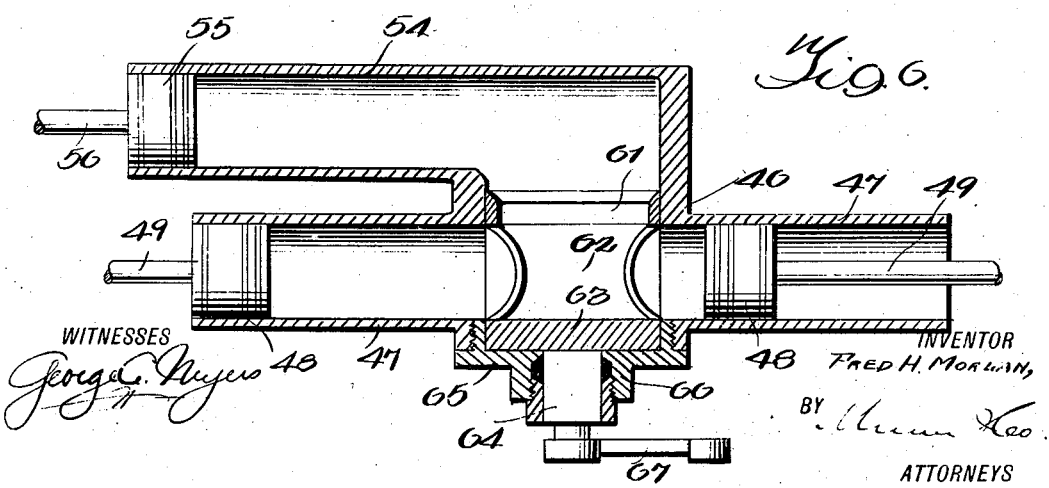

The invention is illustrated in way of example in the accompanying drawings, in which:

Figure 1 is a group perspective view illustrating the invention applied to the rear axle of an automobile and the associated wheel removed, Figure 2 is a view in sectional elevation showing the inner side of the brake apparatus and the associated axle and its housing in section, Figure 3 is a central vertical sectional view of the same, Figure 4 is a group view illustrating associated detail parts of the apparatus, Figure 5 is a view similar to Figure 2 but showing a modified form of control valve, Figure 6 is a horizontal sectional view of the control valve shown in Figure 5.

Referring to the drawings generally 10 indicates a rear portion of an automobile, 11 the rear axle housing, 12 the axle, 14 a rear wheel, and 15 the usual brake drum carried by the wheel when a form of friction brake is used.

Now referring particularly to Figures 1 to 4, inclusive; the principal part of the apparatus consists in a casting which comprises a hollow annular portion 16, the passage 17 which communicates with a plurality of radial cylinders 18, said annular portion 17 and cylinders 18 being all integrally connected by a plurality of web-plates 19, a plate occurring between each adjacent pair of cylinders as shown. Also each web-plate 19 has its outer portion extending beyond the outer ends of the cylinders 18 and terminating in an eye 20 for the purpose which will later appear.

The annular portion 16 of the casting is adapted to be fitted upon the rear axle housing 11 of the automobile. Within the annular portion 16 there is rotatably positioned a sleeve 21, which is provided with a series of openings 22 arranged circumferentially thereof, one for each cylinder 18, and adapted to be brought into registration therewith. Between two adjacent cylinders 18 there is formed a housing 23 within which there is rotatably mounted a cog wheel 24, which projects through a suitable slot in the annular portion 16 and operatively engages with a sector of teeth formed upon the outer periphery of the sleeve 21 as at 25, Figure 3. To the cog wheel 24 there is connected an arm 26 adapted for rotating, the same and to the outer end of the lever bar there is pivotally connected the one end of an operating rod 27' which may be suitably connected with means whereby the driver of the automobile may operate the same. The housing 23 and likewise the annular portion 16 of the casting are open on their inner side, and each covered by a plate 27 which is formed with a sleeve extension 28 adapted to telescope the axle housing 11. The plate 27 is secured to the annular portion 16 and also housing 23 by flange bolts as at 29, and its sleeve portion 28 riveted to the axle housing as at 30. The arm 26 preferably operates on the outer side of the plate 27 as shown in Figure 2 and the portion of the plate covering the housing 27 is formed with a suitable opening at 31, Figure 4, to receive the journal of the cog wheel 24.

With the cover plate 27 there is formed a cylinder 32, Figure 2, which extends at right angles to the plate and has disposed therein a piston 33. The outer end of the piston is pivotally connected to the one end of a bell crank lever 34 as at 35. The bell crank lever 34 is fulcrumed upon one of the web-plates 19 as at 36 and its other end pivotally connected to an operating rod 37 which like the operating rod 27 may be connected through suitable means not shown whereby the same may be operated by the driver of the automobile.

Each cylinder 18 is provided with a piston 38 which is equipped with suitable packing rings as shown in Fig. 3. Each piston 38 has pivoted thereto the one end of a push rod 39 which rotatably supports a roller 40 at its outer end. The outer end of each push rod 39 has pivotally connected thereto the one end of a guide bar 41, said bars each extending in an anti-clockwise direction with respect to the casting and having its other end pivoted to the eye 20 of the associated web-plate 19 as at 42.

When the wheel 14 of the automobile is placed upon its spindle, the brake drum 15 thereof encloses the cylinders 18 the rods 27 and 37 however being free to operate. In the present case the drum 15 is formed with a rib or flange 43 the inner periphery of which is eccentric and in radial alignment with the piston push rod 39 and adapted to be engaged by the rollers 40 carried thereby.

In the operation of the apparatus heretofore described assuming that the pistons 38 are each disposed at the end of its inward stroke and that the piston 32 has been drawn outwardly as far as possible, and also that the passage 17 and the interior of cylinder 32 are filled with oil or other liquid; if under these conditions the wheel 14 and its drum 15 is rotating no braking action will be had. This is one condition of the apparatus which may exist when the brake is not in use. A second and more preferable condition however is when the piston 33 is moved to its inner position and the oil in cylinder 32 injected into the passage 17. With this occurring the pistons 38 will be moved outwardly to such an extent that the rollers 40 will each be engaged by the eccentric 43 for a certain period during each complete rotation of the drum 15 thereby causing the pistons 38 associated therewith to move inwardly. It is obvious that under the circumstances the oil given up by the cylinder 32 will be taken up by some of the cylinders 18 and that as each piston 38 moves inwardly, when so actuated by the rotation of the drum 15, that other cylinders will accommodate the oil returned to the passage 17. During this operation no perceptible braking action of the wheel will occur.

When it is desired to utilize the apparatus for retarding the rotation of the automobile wheel, then the sleeve 21 is rotated by the operating rod 27 and the passage into each cylinder 18 decreased. The passages may be decreased to any extent desired and of course the more restricted the greater the braking action. When the sleeve 21 is sufficiently rotated to close the passages leading into the cylinders then a dead lock against the rotation of the wheel would occur.

The apparatus heretofore described is particularly adapted for motor vehicles carrying a relatively large brake drum. For motor vehicles having a smaller drum, I propose the modification shown in Figures 5 and 6. Referring to these figures, it will be observed that the drum 44 is, formed with a laterally extending eccentric flange 45, the inside diameter is less than the eccentric flange 43 of the drum 15. In this instance a hollow casting 46 is provided and suitably supported by the outer ends of the rear axle housing in any suitable manner. The casting 46 has extending, therefrom, a pair of aligned cylinders 47 each of which communicates with the interior of the casting. A piston 48 is provided for each cylinder 47 which has rigidly extending therefrom a push rod 49. To the outer end of each push rod there is pivotally connected as at 50 the one end of a lever bar 51. Each lever bar 51 is suitably fulcrumed at a point intermediate its ends as at 52 upon suitable stationary supporting means, while the free end of each lever bar rotatably supports a roller 53 which is adapted to engage the outer periphery of the eccentric 45. A coil spring 56 is provided for each of the lever arms 51 adapted to yieldingly hold the pistons 48 against outward movement.

The casting 46 terminates at its one end in a third cylinder 54 which is preferably disposed parallel to the cylinders 47. The cylinder 54 communicates with the casting 46; and is provided with a piston 55 which has extending therefrom a push rod 56 which is pivotally connected at its free end to a lever bar 57 said lever bar being suitably fulcrumed as at 58 to a stationary support and having its other end pivotally connected to the one end of an operating rod 59 as at 60, said rod 59 being suitably connected to means not shown whereby the same may be operated by the driver of the motor vehicle with which the present apparatus may be associated. Within the casting 46 there is fitted a valve sleeve 61 which is formed with a pair of registering openings 62 adapted to be brought into alignment with the cylinders 47. The sleeve 61 is closed at its one end as at 63, said closure being formed with a boss 64 which is rotatably supported by a screw cap 65. Also a suitable stuffing box arrangement is provided for the boss 64 as at 66. The outer end of the boss 64 is reduced as shown and operatively connected to a lever arm 67, the outer or free end of said lever arm being in turn pivotally connected to the one end of an operating rod 68 which is extended through suitable means not shown to be operated by the device of the motor vehicle.

Assuming that the pistons 48 and 55 are in the positions shown in Figure 6, that the casting together with the cylinder are filled with oil or other suitable liquid as indicated in the drawings, and that the openings 62 of the valve sleeve 61 register with the cylinders 47; now upon the rotation of the eccentric 45 the pistons 48 will of course be reciprocated, the oil displaced by one cylinder will be taken up by the other and thus no braking action will result.

Should it be desired to gradually retard the rotation of the wheel with which the eccentric 45 is associated the piston 56 is moved inwardly to crowd the oil therein into the casting 46 insuring that the body of oil is reduced as much as possible. The valve sleeve 61 is now operated to restrict the passage of each cylinder 47 into the casting 46. As is obvious the braking of the arms 51 will thus proportionally increase with the restrictions of these passages by the valve sleeve and thus a variable retardation of the motor vehicle wheel may be accomplished. Should it be desired to lock the wheel against rotation the valve sleeve 61 should be rotated to close the communication between the cylinders 47 and casting 46. As is obvious the wheel will now be locked against rotation by the action of the lever arms 51 in a positive and reliable manner.

While I have shown and described the preferred form of my invention, it is to be understood that I am aware of the fact that the constructure, combination and arrangement of parts may be changed by those skilled in the art without departing from the spirit of the invention.

I claim:

1. A brake apparatus of the character described comprising a body of liquid, a retainer therefor, means for increasing the volumn of liquid within said retainer, and means adapted to be brought into position for braking action by the increase of said liquid.

2. A brake apparatus of the character described comprising a body of liquid, a retainer therefor, means by which said body of liquid may be increased, and movable means adapted to be brought into position for braking action with the increase of said liquid.

3. A brake apparatus of the character described comprising a body of liquid a retainer therefor, means operable from a remote point by which said body of liquid may be increased, and movable means adapted to be brought into position for braking action with the increase of said liquid.

4. An apparatus of the character described comprising a body of liquid, a retainer therefor, a plurality of cylinders communicating with said retainer, a piston within each cylinder, means associated with said pistons whereby when at the outer end of the cylinders a braking action may be had, and means for increasing the body of liquid.

5. An apparatus of the character described comprising a body of liquid, a retainer therefor, a plurality of cylinders communicating with said retainer, a piston within each cylinder, means associated with said pistons whereby when at the outer end of the cylinders a braking action may be had, and means controllable from a remote point for increasing said body of liquid.

6. An apparatus of the character described comprising a body of liquid, a retainer therefor, a plurality of cylinders communicating with said retainer, a piston within each cylinder, means associated with said pistons whereby when at the outer end of the cylinders a braking action may be had, and means for increasing the body of liquid, and means whereby said braking action may be increased.

7. A brake apparatus of the character described comprising a body of liquid, a retainer therefor, a plurality of cylinders communicating with said retainer, a piston for each cylinder, a rotating member, means between said rotating member and pistons whereby said piston will be reciprocated and means whereby the body of liquid may be increased for retarding said rotating member.

8. A brake apparatus of the character described comprising a body of liquid, a retainer, therefor, a plurality of cylinders communicating with said retainer, a piston for each cylinder, a rotating member, means between said rotating member and pistons whereby said piston will be reciprocated and means whereby the body of liquid may be increased for retarding said rotating member, and means for restricting the communication between said cylinders and retainer for proportionally increasing the retardation of said movable member.

9. A brake apparatus of the character described comprising a body of liquid, a retainer therefor, a plurality of cylinders communicating with said retainer, a piston for each cylinder, a rotating member, means between said rotating member and pistons whereby said piston will be reciprocated and means whereby the body of liquid may be increased for retarding said rotating member, and means operable from a remote point for closing the communication between the cylinder and said liquid retainer whereby a locking action of the rotating member may be had.

10. In combination with a vehicle wheel, a stationary container, having a body of liquid therein, a plurality of passages communicating with said container, a moving element in each passage, means between said movable elements and the wheel whereby said movable elements will be reciprocated by the coaction of the rotation of said wheel, a body of oil, and means for utilizing the liquid within the container for yieldingly resisting the reciprocal movement of said movable member.

11. A brake apparatus of the character described comprising a body of liquid, a retainer therefor, a plurality of cylinders communicating with said retainer, a piston for each cylinder, a rotating member, means between said rotating member and pistons whereby said pistons will be reciprocated and means whereby the body of liquid may be increased for retarding said rotating member, and means operable from a remote point for closing the communication between the cylinders and said liquid retainer whereby a locking action of the rotating members may be had, and adjustable means whereby the liquid within the container may be utilized for yieldingly resisting the movement of said movable members.

12. In combination with a vehicle wheel, a stationary container having a quantity of liquid therein, a plurality of cylinders communicating therewith a piston for each cylinder, means for increasing the liquid within the container, means between the pistons and wheel whereby the wheel during rotation will cooperate with said liquid for reciprocating said pistons, and means for yieldingly resisting the reciprocation of said pistons for retarding the rotation of said wheel.

13. In combination with a vehicle wheel, a stationary container having a quantity of liquid therein, a plurality of cylinders communicating therewith a piston for each cylinder, means between the pistons and wheel whereby the wheel during rotation will cooperate with said liquid for reciprocating said pistons, and means for locking said pistons against movement in one direction and thereby locking said wheel against rotation.

14. In combination with a vehicle wheel, a stationary container having a quantity of liquid therein, a plurality of cylinders communicating therewith a piston for each cylinder, means for increasing the liquid within the container, an eccentric carried by said wheel adapted to cooperate with the liquid within said container for reciprocating said pistons during the rotation of said wheel, and means whereby the liquid may be utilized for yieldingly resisting said reciprocation of the pistons and thereby retarding the rotation of the wheel.

15. In combination with a vehicle wheel, a stationary container having a quantity of liquid therein, a plurality of cylinders communicating therewith a piston for each cylinder, means for increasing the liquid within the container, an eccentric carried by said wheel adapted to cooperate with the liquid within said container for reciprocating said pistons during the rotation of said wheel, and means whereby the communication between said cylinders and container may be restricted and thereby retarding the movement of said pistons.

16. In combination with a vehicle wheel, a stationary container having a quantity of liquid therein, a plurality of cylinders communicating therewith a piston for each cylinder, means for increasing the liquid within the container, an eccentric carried by the wheel adapted to cooperate with the liquid within said container for reciprocating said pistons during the rotation of said wheel, and means whereby the communication between said cylinders and container may be restricted at various degrees and thereby retarding the movement of said pistons.

17. An apparatus of the character described, comprising a body of liquid, a retainer therefor, a plurality of cylinders communicating with said retainer, a piston within each cylinder, means for increasing the body of liquid, and means associated with said pistons whereby a braking action may be had with the increasing of said body of liquid.

18. A brake apparatus, comprising a body of liquid, a retainer therefor, means for changing the volume of said body of liquid, and means adapted to be brought into braking action by the change of volume in said body of liquid.

FRED H. MORLAN.